(12) United States Patent
Yu et al.

(10) Patent No.: US 12,130,589 B2
(45) Date of Patent: Oct. 29, 2024

(54) METHOD AND APPARATUS FOR MODULATING DEPTH OF HOLOGRAM AND HOLOGRAPHIC DISPLAY USING THE SAME

(71) Applicant: SAMSUNG ELECTRONICS CO., LTD., Suwon-si (KR)

(72) Inventors: Hyeonseung Yu, Suwon-si (KR); Daeho Yang, Seoul (KR); Hongseok Lee, Seoul (KR); Wontaek Seo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 17/885,258

(22) Filed: Aug. 10, 2022

(65) Prior Publication Data
US 2023/0236544 A1    Jul. 27, 2023

(30) Foreign Application Priority Data

Jan. 21, 2022 (KR) .................. 10-2022-0009231

(51) Int. Cl.
*G03H 1/22* (2006.01)
*G02B 30/00* (2020.01)
*G06T 7/50* (2017.01)

(52) U.S. Cl.
CPC .......... *G03H 1/2202* (2013.01); *G02B 30/00* (2020.01); *G06T 7/50* (2017.01); *G03H 2225/30* (2013.01); *G03H 2226/02* (2013.01); *G06T 2207/10024* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2017/0038727 A1 | 2/2017 | Kim et al. |
| 2017/0148151 A1 | 5/2017 | Oh et al. |
| 2021/0279951 A1 | 9/2021 | Yoon et al. |
| 2022/0171334 A1 | 6/2022 | Yang et al. |
| 2022/0221822 A1 | 7/2022 | Kim |

FOREIGN PATENT DOCUMENTS

| KR | 10-2017-0060725 A | 6/2017 |
| KR | 10-2017-0072115 A | 6/2017 |
| KR | 10-2020-0090417 A | 7/2020 |

(Continued)

OTHER PUBLICATIONS

Paturzo et al., "Synthesis and display of dynamic holographic 3D scenes with real-world objects", Optics Express, vol. 18, No. 9, Apr. 13, 2020 (Year: 2010).*

(Continued)

*Primary Examiner* — James M Anderson, II
(74) *Attorney, Agent, or Firm* — Sughrue Mion, PLLC

(57) ABSTRACT

A method of modulating a depth of a hologram, the method includes: obtaining hologram data; determining a scale factor based on a hardware specification of a holographic display to display a three-dimensional (3D) hologram image in a space by using the hologram data; and modulating depth information of the hologram data based on the scale factor.

18 Claims, 12 Drawing Sheets

(56) References Cited

FOREIGN PATENT DOCUMENTS

| KR | 10-2129069 B1 | 7/2020 |
|---|---|---|
| KR | 10-2021-0113053 A | 9/2021 |
| KR | 10-2022-0076946 A | 6/2022 |

OTHER PUBLICATIONS

Communication issued Jun. 13, 2023 by the European Patent Office in counterpart European Patent Application No. 22202527.2.
Paturzo, Melania et al., "Synthesis and display of dynamic holographic 3D scenes with real-world objects", Optics Express, Apr. 13, 2020, vol. 18, No. 9, pp. 8806-8815, XP009148111.
Matsushima, Kyoji, "Digital signal processing of light in holographic 3D imaging", Proceedings of SPIE, IEEE, vol. 9599, Sep. 22, 2015, pp. 95990H-1-95990H-10, XP060060858.
Shi et al., "Towards real-time photorealistic 3D holography with deep neural networks," Nature, vol. 591, Mar. 2021, Total 20 pages.
He et al., "Deep Residual Learning for Image Recognition," arXiv:1512.03385v1 [cs.CV], Dec. 2015, Total 12 pages.
Chen et al., "Multi-depth hologram generation using stochastic gradient descent algorithm with complex loss function," Optics Express, vol. 29, No. 10, pp. 15089-15103, May 2021.

\* cited by examiner

METHOD AND APPARATUS FOR MODULATING DEPTH OF HOLOGRAM AND HOLOGRAPHIC DISPLAY USING THE SAME

CROSS-REFERENCE TO RELATED APPLICATION

This application is based on and claims priority under 35 U.S.C. § 119 to Korean Patent Application No. 10-2022-0009231, filed on Jan. 21, 2022, in the Korean Intellectual Property Office, the disclosure of which is incorporated by reference herein in its entirety.

BACKGROUND

1. Field

The disclosure relates to a method and apparatus for modulating a depth of a hologram, and a holographic display using the same.

2. Description of the Related Art

Holography refers to three-dimensional (3D) display technology enabling reproduction of an object in a 3D space by adjusting an amplitude and a phase of light, and by using holography, an object may be expressed without limitation in view and stereoscopic fatigue. For example, a 3D holographic display may implement a high-definition hologram in real time by using a spatial light modulator (SLM) capable of simultaneously controlling an amplitude and a phase of light.

Hologram data including amplitude and phase information of an object wave is required for a holographic display to display a 3D image. The hologram data may be obtained by capturing, by a holographic camera, such as a self-interference digital holography camera, an object or calculating the object by a computer algorithm, such as computer-generated holography (CGH).

SUMMARY

Provided are a method and apparatus for modulating a depth of a hologram, and a holographic display using the same. The technical objectives which the disclosure aims to achieve are not limited to the foregoing, and other objectives may be inferred from the following embodiments.

Additional aspects will be set forth in part in the description which follows and, in part, will be apparent from the description, or may be learned by practice of the presented embodiments of the disclosure.

According to an aspect of the disclosure, there is provided a method of modulating a depth of a hologram, the method including: obtaining hologram data, determining a scale factor based on an actual hardware specification of a holographic display to display a three-dimensional (3D) hologram image in a space by using the hologram data and modulating depth information of the hologram data based on the scale factor.

The modulating of the depth information of the hologram data may include modulating the depth information of the hologram data by using a neural network trained to correct depth distortion due to a difference between an assumed hardware specification assumed when generating the hologram data and the actual hardware specification of the holographic display.

The modulating of the depth information of the hologram data may further include selecting, among a plurality of pre-trained neural networks, the neural network corresponding to the scale factor; and obtaining modulated hologram data by inputting the hologram data to the selected neural network.

The modulating of the depth information of the hologram data may further include obtaining modulated hologram data by using a pre-trained neural network having both the scale factor and the hologram data as inputs.

The method may further include training the neural network, wherein the training of the neural network includes: generating input hologram data based on a red-green-blue (RGB) image and a depth map, obtaining output hologram data by inputting the input hologram data to the neural network, generating focal stack images by propagating the output hologram to certain depths and training the neural network based on a loss function representing a difference between the focal stack images and reference focal images.

The reference focal images may correspond to target hologram data generated by directly reflecting the scale factor to the RGB image and the depth map.

The neural network may be trained to output the target hologram data based on an input of the input hologram data even without information about the RGB image and the depth map corresponding to the input hologram data.

The certain depths may be variable based on the scale factor.

The determining of the scale factor may include calculating the scale factor based on a ratio between a pixel pitch assumed when generating the hologram data and an actual pixel pitch of the holographic display.

The hologram data may correspond to hologram contents directly captured by a holographic camera or previously generated through computer-generated holography (CGH).

According to another aspect of the disclosure, there is provided a hologram depth modulation apparatus including: a memory storing one or more instructions; and a processor configured to execute the one or more instructions to: obtain hologram data, determine a scale factor based on an actual hardware specification of a holographic display to display a three-dimensional (3D) hologram image in a space by using the hologram data and modulate depth information of the hologram data based on the scale factor.

According to another aspect of the disclosure, there is provided a holographic display including at least one optical element, a spatial light modulator (SLM) configured to modulate light incident from the at least one optical element, a memory storing one or more instructions and at least one processor configured to execute the one or more instructions to: obtain hologram data, determine a scale factor based on an actual hardware specification of a holographic display to display a three-dimensional (3D) hologram image in a space by using the hologram data, modulate depth information of the hologram data based on the scale factor, and play modulated hologram data by using the at least one optical element and the SLM.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
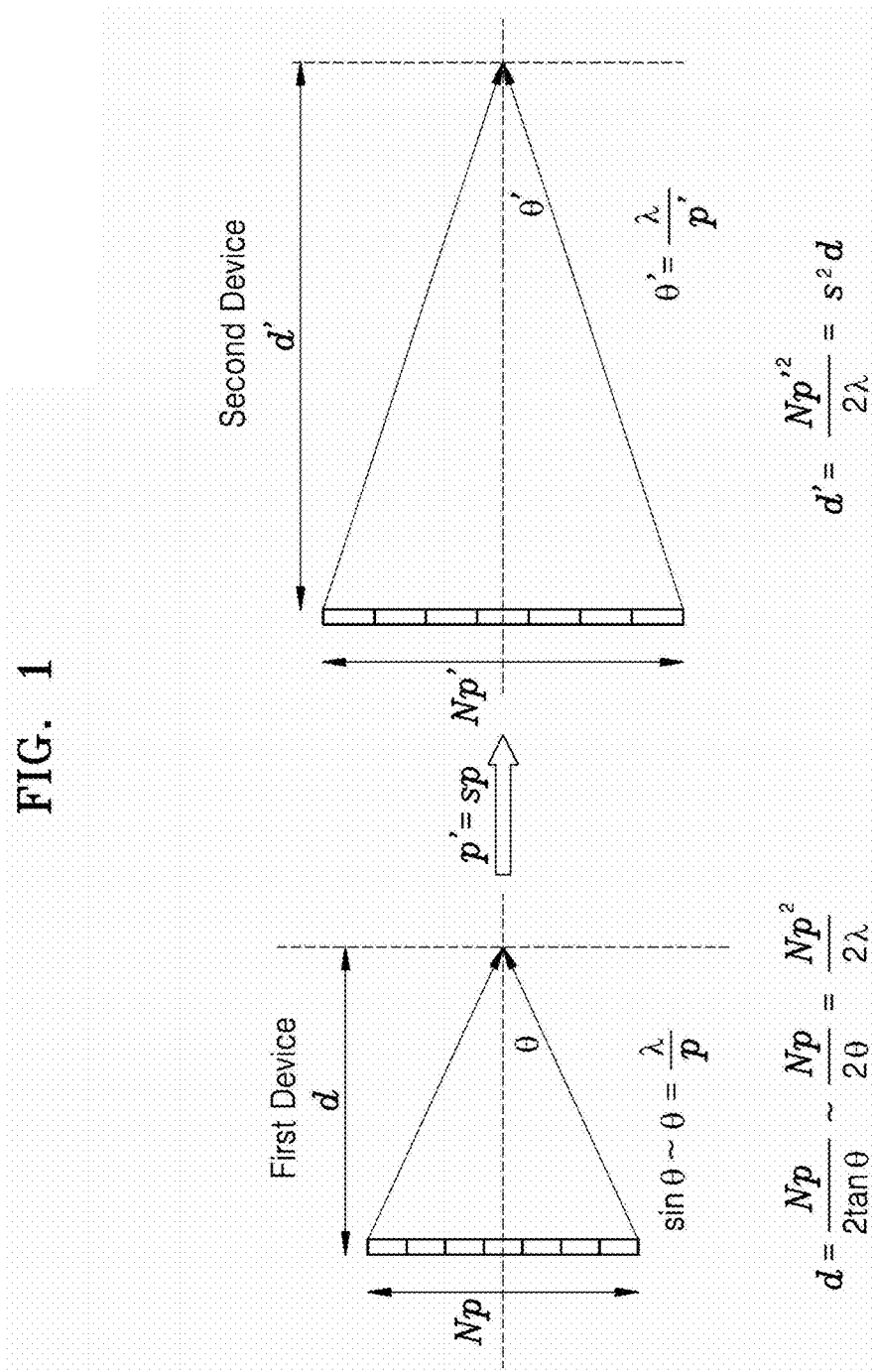
FIG. 1 is a diagram for explaining a cause of depth distortion of a hologram according to a hardware specification of a holographic display.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

General terms which are currently used widely have been selected for use in consideration of theirs functions in embodiments; however, such terms may be changed according to an intention of a person skilled in the art, precedents, advent of new technologies, etc. Further, in certain cases, terms have been arbitrarily selected, and in such cases, meanings of the terms will be described in detail in corresponding descriptions. Accordingly, the terms used in the embodiments should be defined based on their meanings and overall descriptions of the embodiments, not simply by their names.

In some descriptions of the embodiments, when a portion is described as being connected to another portion, the portion may be connected directly to another portion, or electrically connected to another portion with a component arranged therebetween. When a portion "includes" a component, another component may be further included, rather than excluding the existence of other components, unless otherwise described.

The terms "comprise," "include," etc. used in the embodiments should not be construed as including all components or operations described in the specification, and may be understood as not including some of the components or operations, or further including additional components or operations.

While such terms as "first," "second," etc., may be used to describe various components, such components must not be limited by the above terms. The above terms are used only to distinguish one component from another.

The descriptions of the following embodiments should not be construed as limiting the scope of rights, and matters that those skilled in the art can easily derive should be construed as being included in the scope of rights of the embodiments. Hereinafter, embodiments will be described in detail as an example, with reference to the attached drawings.

FIG. 1 is a diagram for explaining a cause of depth distortion of a hologram according to a hardware specification of a holographic display.

A hologram may reproduce three-dimensional (3D) depth information of an object, based on amplitude and phase information of an object wave. The hologram may be rendered or reproduced only by a holographic display capable of expressing a complex wavefront, not by a general 2D display. In a 2D display, depth distortion may not need to be considered; however, providing proper depth information is important in a holographic display.

In case of a 2D display, when monitors having different pixel pitches are used to display an image of the same resolution, only an area of an image region and a resolution perceived by an observer may vary, but no additional image correction is required.

On the contrary, in case of a 3D holographic display, when playing the same hologram data by using holographic displays having different hardware specifications, depth distortion may occur.

FIG. 1 illustrates a case where a first holographic display including a spatial light modulator (SLM) of which pixel pitch is p and a second holographic display including an SLM of which pixel pitch is p' play the same hologram data. When p'=sp, a scale factor of the second holographic display with respect to the first holographic display may be defined as 's'.

When a wavelength of light used in the first holographic display is λ, a maximum angle at which light, which has passed through the SLM, is diffracted in the first holographic display may be approximately λ/p. When a focus is formed in a 3D space by generating an N×N fresnel zone plate (FZP) pattern at the SLM of the first holographic display, a distance d at which the focus is formed may be calculated according to Equation 1 below.

$$d = \frac{Np}{2\tan\theta} \sim \frac{Np}{2\theta} = \frac{Np^2}{2\lambda} \qquad \text{[Equation 1]}$$

When the same FZP pattern is formed at the SLM of the second holographic display, a distance d' at which a focus is formed may be calculated according to Equation 2 below.

$$d' = \frac{Np'^2}{2\lambda} = s^2 d \qquad \text{[Equation 2]}$$

As such, when a pixel pitch of a holographic display is increased s times, as a distance at which a focus is formed is not increased proportionally but is increased $s^2$ times, distortion in a depth direction may occur. Accordingly, a depth of a hologram needs to be properly corrected based on a hardware specification of a holographic display to accurately express an originally intended 3D image based on hologram data.

However, when the hologram data is obtained by a holographic camera, a directly photographed hologram may accurately express an actual physical distance of an object in a 3D space or express a depth recorrected according to parameters of the holographic camera. As described above, as depth information is immanently reflected in the hologram data obtained by the holographic camera, the depth information may not be directly corrected.

Meanwhile, when the hologram data is obtained by a computer algorithm, the hologram data may be calculated based on an RGB-D input including a red-green-blue (RGB) image and a depth map. Accordingly, in a process of generating hologram data, by properly correcting the RGB-D input, a hologram having desired depth information may be generated. However, there is no known methodology to correct depth information of a hologram when only hologram data, which has already been generated, is provided without an original RGB-D input.

According to the disclosure, a method and apparatus for directly modulating depth information of a hologram, which has already been generated or captured, without a map, may be provided. Hereinafter, a method and apparatus for modulating a depth of a hologram, according to the disclosure, are described in more detail with reference to the accompanying drawings.

Figure 2:
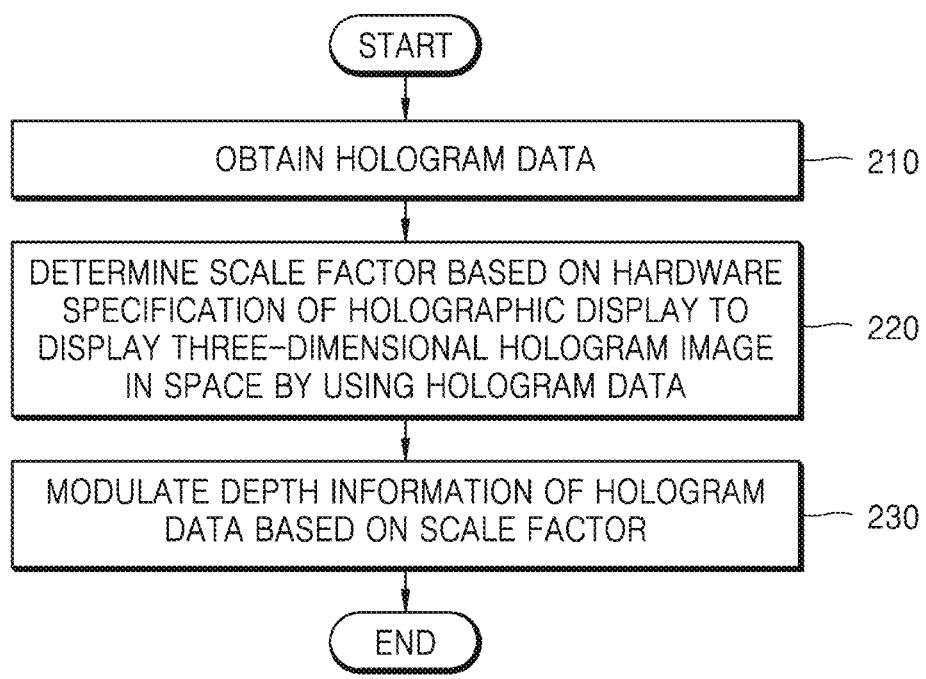
FIG. 2 is a flowchart illustrating a method of modulating a depth of a hologram, according to an example embodiment.

FIG. 2 is a flowchart illustrating a method of modulating a depth of a hologram, according to an example embodiment.

FIG. 2 illustrates operations processed by a hologram depth modulation apparatus according to the disclosure. The hologram depth modulation apparatus may refer to all apparatuses including a processor and a memory, as described below with reference to FIG. 7. For example, the hologram depth modulation apparatus may be an application processor implemented as a System-on-Chip. Furthermore, all electronic devices or electronic systems including an application processor may be collectively referred to as the hologram depth modulation apparatus. However, the application processor is merely an example, and the hologram depth modulation apparatus may include a processor and a memory respectively mounted on separate chips.

In operation 210, the hologram depth modulation apparatus may obtain hologram data. The hologram data may correspond to hologram contents directly captured by a holographic camera or previously generated through the CGH. The hologram data may include a hardware specification of a holographic camera or depth information, which varies according to a control parameter of the CGH. For example, when generating the hologram data, a hardware specification of a holographic display on which generated hologram data is to be displayed may be assumed, and hologram data suitable for the assumed hardware specification may be generated.

In operation 220, the hologram depth modulation apparatus may determine a scale factor based on a hardware specification of a holographic display to display a 3D hologram image in a space by using hologram data. For example, the hologram depth modulation apparatus may calculate the scale factor based on a ratio between a pixel pitch assumed when generating the hologram data and an actual pixel pitch of the holographic display.

As described with reference to FIG. 1, when the pixel pitch assumed when generating the hologram data is p, and the actual pixel pitch of the holographic display is p', the scale factor may be calculated by s=p'/p. However, the disclosure is not limited thereto, and the scale factor may have other values calculated considering the pixel pitch assumed when generating the hologram data and the actual pixel pitch of the holographic display. Furthermore, the scale factor may be determined based on hardware specifications other than the pixel pitch.

In operation 230, the hologram depth modulation apparatus may modulate depth information of hologram data based on a scale factor. For example, the hologram depth modulation apparatus may modulate depth information of hologram data by using a neural network trained or learned to correct depth distortion due to a difference between a hardware specification assumed when generating the hologram data and an actual hardware specification of a holographic display.

Meanwhile, the aforementioned method of modulating a depth of a hologram may be recorded on a computer-readable recording medium on which one or more programs including instructions to execute the method are recorded. The computer-readable recording medium may include a hardware device specifically configured to store and execute program instructions, such as magnetic media including a hard disk, a floppy disk, and a magnetic tape, optical media, such as a CD-ROM and a DVD, magneto-optical media, such as a floptical disk, read-only memory (ROM), random-access memory (RAM), flash memory, etc. The program instructions may include not only machine language code, which is made by a compiler, but also high level language code executable by a computer by using an interpreter, etc.

Figure 3:
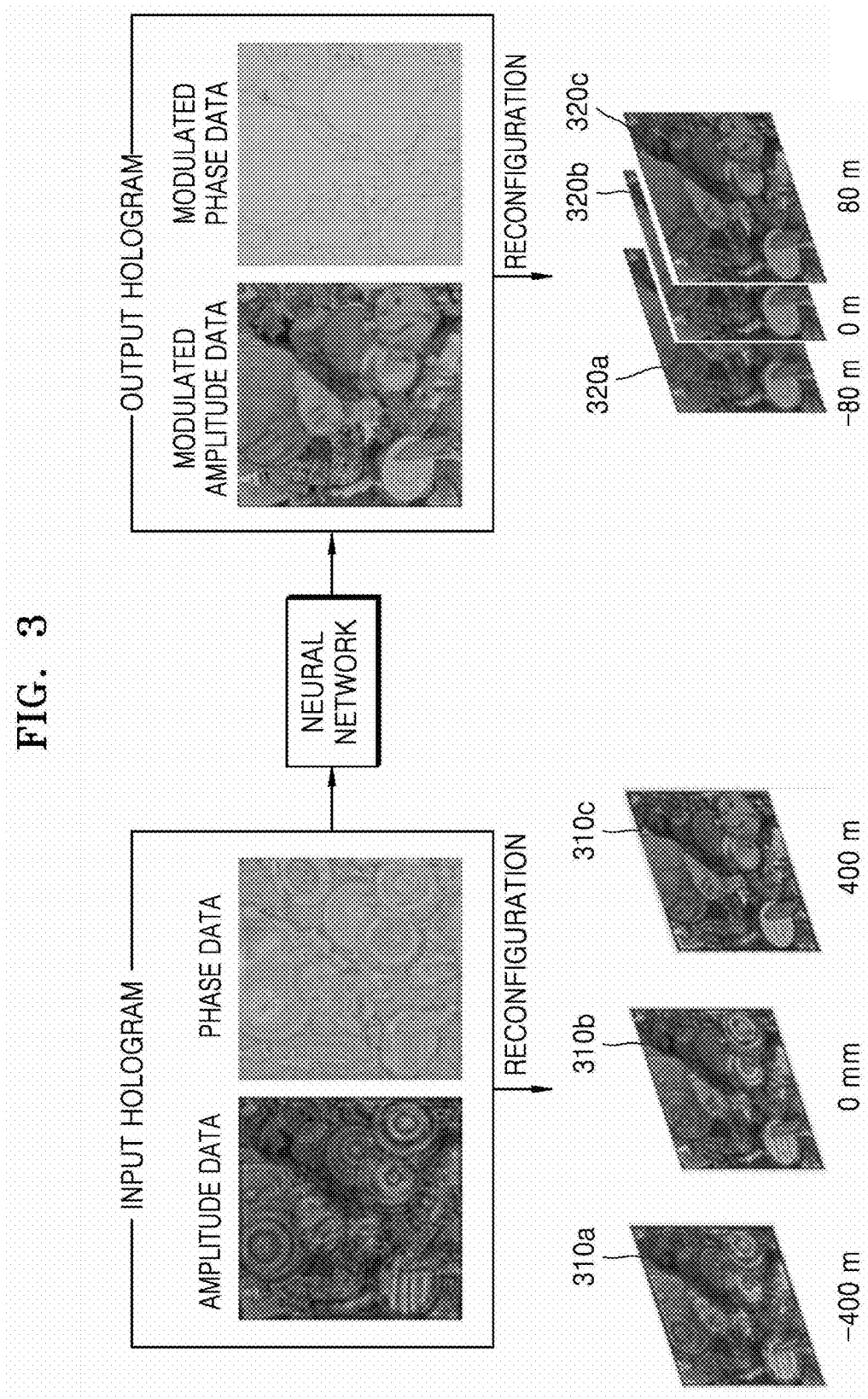
FIG. 3 is a diagram for explaining a process of modulating depth information of hologram data by using a neural network, according to an example embodiment.

FIG. 3 is a diagram for explaining a process of modulating depth information of hologram data by using a neural network, according to an example embodiment.

The neural network may have an architecture of deep neural network (DNN) or n-layers neural networks. The DNN or the n-layers neural networks may be convolutional neural networks (CNN), recurrent neural networks (RNN), deep belief networks, restricted Boltzmann machines, residual neural networks (Resnet), etc. However, the disclosure is not limited thereto, and the neural network may have various other architectures.

As illustrated in FIG. 3, an input of the neural network according to the disclosure may be hologram data, and an output of the neural network may be depth-modulated hologram data. The hologram data may include a combination of 2D amplitude data and 2D phase data. However, the disclosure is not limited thereto, and the hologram data may include 2D complex data, and may also include a combination of 2D real part data and 2D imaginary part data. Here, the 2D data may include 3 channel data corresponding to RGB information. A format of input hologram data and output hologram data may be identical, but this is not essential.

The neural network may be trained or learned to properly recognize depth information implicitly included in the input hologram data, and convert the same into a desired depth area. For example, as illustrated in FIG. 3, the input hologram data may express a 3D image of ±400 mm area in the depth direction, whereas the output hologram data modulated by the neural network may express a 3D image of ±80 mm area, which is one-fifth of the ±400 mm area. When the holographic display renders or reproduces the input hologram data as it is, depth distortion may occur; however, when the holographic display renders or reproduces the output hologram data, no depth distortion may occur.

The input hologram data may be reconfigured to focal images (e.g., a focal image 310a, a focal image 310b, and a focal image 310c) forming a focus at depths of −400 mm, 0 mm, and 400 mm, respectively, and the output hologram data may be reconfigured to focal images (e.g., a focal image 320a, a focal image 320b, and a focal image 320c) forming a focus at depths of −80 mm, 0 mm, and 80 mm, respectively. Upon comparing the focal image 310a with the focal image 320a, the focal image 310b with the focal image 320b, and the focal image 310c with the focal image 320c, it is understood that the perceptional depth may be properly adjusted. Although FIG. 3 illustrates focal images for three depths, the depths are provided merely as an example, and focal images for other depths in the depth area may be compared as well.

In the embodiment of FIG. 1, the neural network may modulate a depth of the hologram data so that a distance d' at which a focus is formed in the second holographic display is sd instead of $s^2 d$. However, the disclosure is not limited thereto, and the neural network may modulate the depth of the hologram data so that the distance d' at which a focus is formed has a value obtained by applying a correction factor to sd considering actual sense of perception of an observer.

Figure 4:
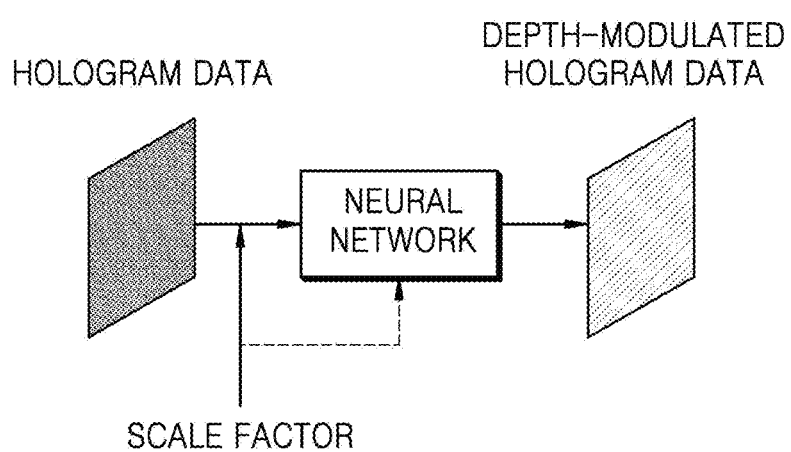
FIG. 4 is a diagram for explaining a method of considering, by a neural network, a scale factor according to an example embodiment.

FIG. 4 is a diagram for explaining a method of considering, by a neural network, a scale factor, according to an example embodiment.

The scale factor may be needed for the neural network to receive hologram data and output depth-modulated hologram data. The scale factor may be reflected on the neural network by two different methods.

Firstly, the neural network may be trained by assuming a particular scale factor. In other words, the neural network may immanently include information about the particular scale factor. In this case, as the neural network is only capable of depth modulation based on a fixed scale factor, a plurality of pre-trained neural networks may be required for the hologram depth modulation apparatus to respond to various situations. Each of the plurality of pre-trained neural networks may be trained by assuming different scale factors.

The hologram depth modulation apparatus may select, among the plurality of pre-trained neural networks, a neural network corresponding to a desired scale factor, and input the hologram data to the selected neural network to obtain modulated hologram data.

Secondly, the neural network may be trained to consider a variable scale factor. In other words, the neural network may receive not only hologram data but also a scale factor as an input. In this case, the hologram depth modulation apparatus may obtain modulated hologram data by using a pre-trained neural network having as an input both of a scale factor and hologram data.

In case of the first method, as the neural network considers a single scale factor, the learning may be easily performed, the size of the network may be reduced, and the operation speed may be fast. In case of the second method, as the neural network modulates depth information of the hologram data considering the variable scale factor, versatility to respond to various situations with a single neural network may be secured.

Figure 5:
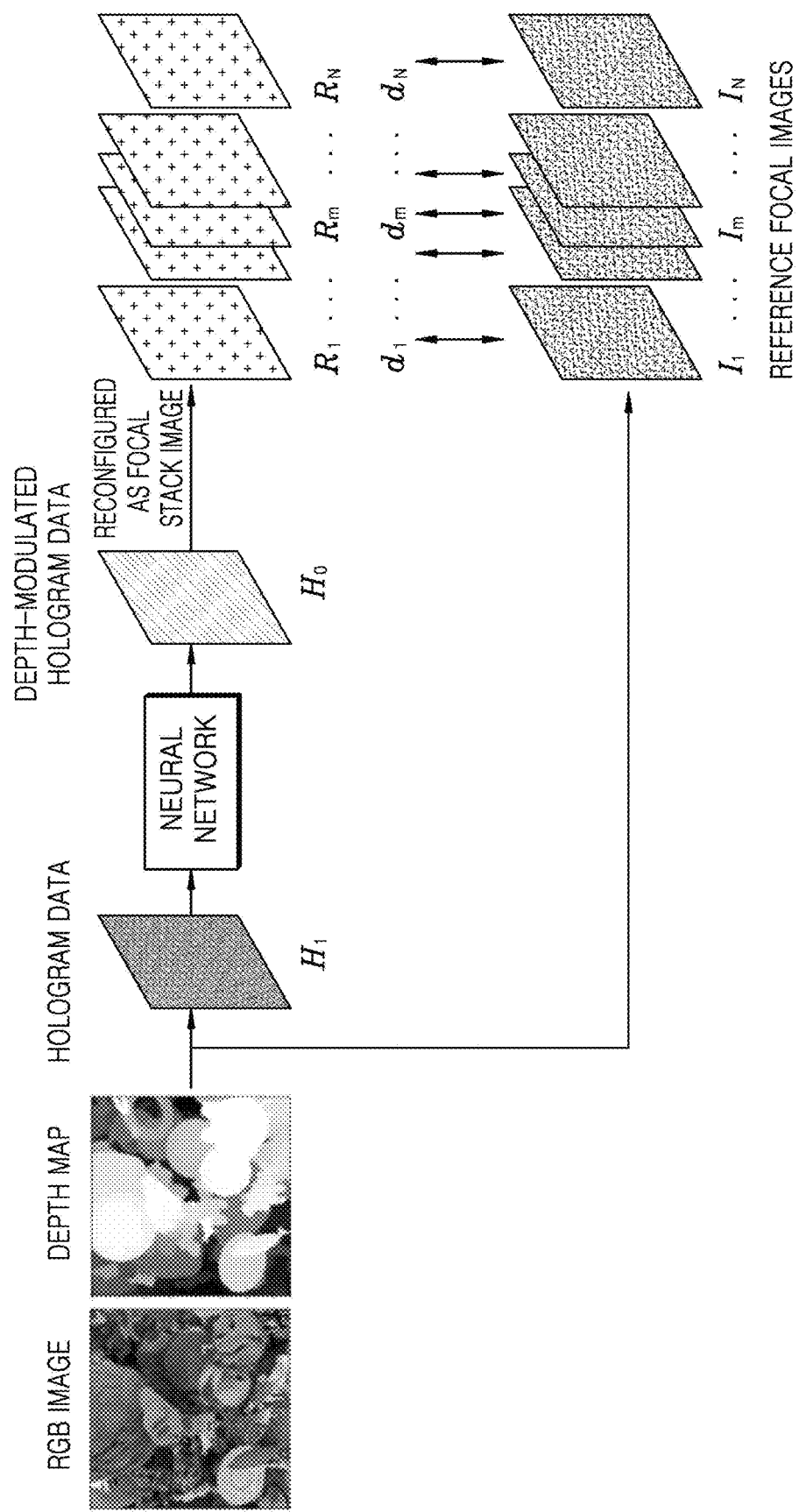
FIG. 5 is a diagram for explaining a learning or a training process of a neural network according to an example embodiment.

FIG. 5 is a diagram for explaining a learning process of a neural network according to an example embodiment.

FIG. 5 illustrates a learning process of the neural network considering a single scale factor. The neural network may immanently include information about a particular scale factor.

The hologram depth modulation apparatus may generate input hologram data $H_i$ based on an RGB image and a depth map. For example, the hologram depth modulation apparatus may generate input hologram data $H_i$ corresponding to the RGB image and the depth map by using a computer algorithm, such as CGH.

The hologram depth modulation apparatus may obtain output hologram data $H_o$ by inputting the input hologram data $H_i$ to the neural network, and may generate focal stack images $R_1, \ldots, R_N$ (N is a natural number) by propagating the output hologram data $H_o$ to certain depths. The focal stack images $R_1, \ldots, R_N$ may refer to a set of images of which focus is formed at each of various depths as the focal images described with reference to FIG. 3. The hologram depth modulation apparatus may obtain an image of which focus is formed at a certain depth $d_m$ (m=1, . . . , N).

The hologram depth modulation apparatus may learn a neural network based on a loss function representing a difference between the focal stack images $R_1, \ldots, R_N$ and reference focal images $I_1, \ldots, I_N$. The loss function may reflect a difference between a focal stack image and a reference focal image for each depth. For example, the loss function may reflect a difference between a focal stack image $R_m$ and a reference focal image 6. The loss function may be defined by various functions, such as a mean square error between images, perceptual loss according to a VGG model, etc.

The hologram depth modulation apparatus may adjust parameters of the neural network so that a value according to the loss function is minimized. The parameters of the neural network may refer to weights representing connection strength among layers or nodes constituting the neural network; however, the disclosure is not limited thereto.

The reference focal images $I_1, \ldots, I_N$ may correspond to target hologram data generated by directly reflecting a scale factor to an RGB image and a depth map. In other words, the reference focal images $I_1, \ldots, I_N$ may be target images directly calculated in relation to a certain depth $d_m$ by using a computer algorithm, such as CGH. The neural network may be learned to output the target hologram data in response to an input of the input hologram data even without information about the RGB image and the depth map corresponding to the input hologram data.

Figure 6:
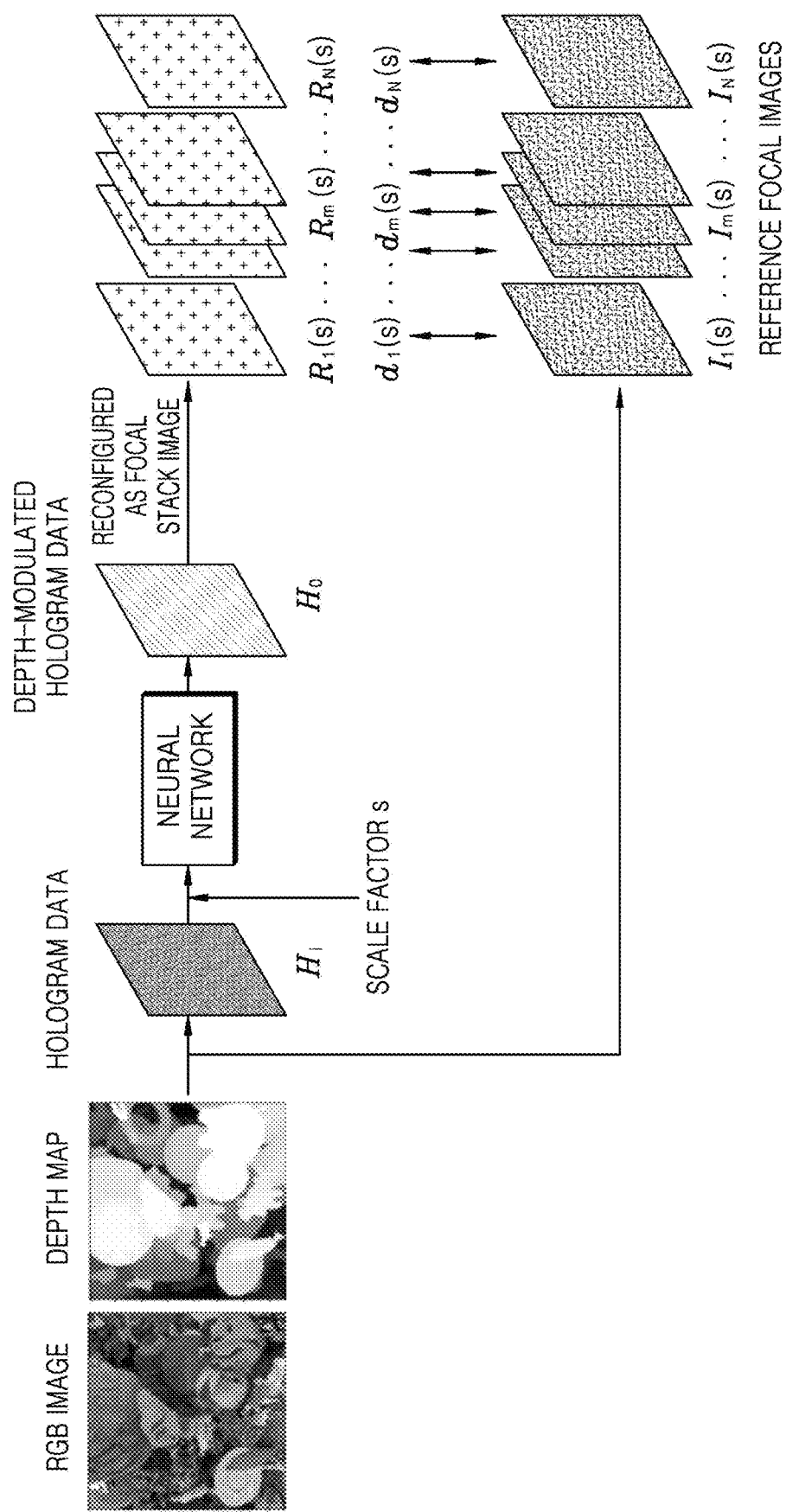
FIG. 6 is a diagram for explaining a learning or a training process of a neural network according to another example embodiment.

FIG. 6 is a diagram for explaining a learning process of a neural network according to another example embodiment.

FIG. 6 illustrates a learning process of the neural network considering a variable scale factor. The learning process of FIG. 6 is substantially similar to the learning process of FIG. 5 except that in the learning process of FIG. 6, the neural network receives a scale factor s as an additional input. Accordingly, any redundant description is omitted.

The neural network considering a variable scale factor may be additionally learned by training sets including various scale factors. For example, the neural network may learn the same input hologram data $H_i$ several times by applying different scale factors. The certain depths $d_m(s)$ corresponding to the focal stack images $R_1(s), \ldots, R_N(s)$ and the reference focal images $I_1(s), \ldots, I_N(s)$ may vary based on a scale factor input to the neural network. The loss function may be defined based on the focal stack images and the reference focal images corresponding to the certain depths $d_m(s)$ which vary according to a scale factor, and the neural network may be learned so that a value according to the loss function is minimized.

Meanwhile, FIGS. 5 and 6 illustrate the learning process of a neural network, which includes generating focal stack images based on output hologram data and reducing a difference between the focal stack images and the reference focal images; however, the disclosure is not limited thereto. The neural network may be learned to directly compare the output hologram data including complex information about an amplitude and phase with target hologram data and reduce a difference therebetween.

Furthermore, although FIGS. 5 and 6 describe that the hologram depth modulation apparatus performs learning of the neural network, the disclosure is not limited thereto. The neural network may be learned by a separate device (e.g., a server, etc.) outside the hologram depth modulation apparatus, and the hologram depth modulation apparatus may receive the learned neural network and perform inference using the learned neural network.

Figure 7:
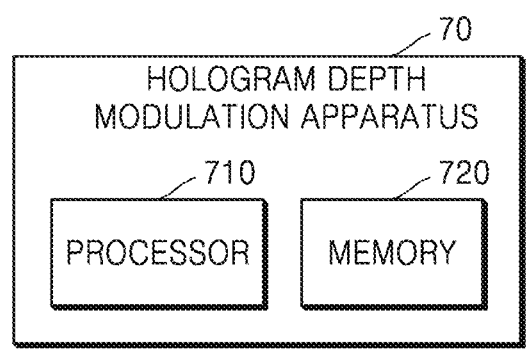
FIG. 7 is a block diagram of components of an apparatus for modulating a depth of a hologram, according to an example embodiment.

FIG. 7 is a block diagram of components of an apparatus for modulating a depth of a hologram, according to an example embodiment.

With reference to FIG. 7, a hologram depth modulation apparatus 70 may include a processor 710 and a memory 720. Meanwhile, only the components relevant to explaining the features of the example embodiments are shown in the hologram depth modulation apparatus 70 of FIG. 7. Accordingly, it is obvious to a person skilled in the art that the hologram depth modulation apparatus 70 may further include other components in addition to the components illustrated in FIG. 7.

Meanwhile, the hologram depth modulation apparatus 70 may correspond to the hologram depth modulation apparatus described with reference to FIGS. 2 to 6, and may process the method illustrated in FIG. 2 in a time sequential manner. Accordingly, although it is not described below, any feature described above in relation to the hologram depth modulation apparatus of FIGS. 2 to 6 may be applied to the hologram depth modulation apparatus 70 of FIG. 7.

The memory 720 may be hardware to store various types of data processed by the hologram depth modulation apparatus 70, and for example, may store data processed or to be processed by the hologram depth modulation apparatus 70. Moreover, the memory 720 may store applications, drivers, etc. to be driven by the hologram depth modulation apparatus 70. The memory 720 may include random access memory (RAM), such as dynamic random access memory (DRAM) and static random access memory (SRAM), read-only memory (ROM), electrically erasable programmable read-only memory (EEPROM), a CD-ROM, a blu-ray disc, or other optical disc storages, a hard disk drive (HDD), a solid state drive (SSD), or flash memory.

The processor 710 may control all operations of the hologram depth modulation apparatus 70. The processor 710 may include a single processor core (i.e., single-core), or multiple processor cores (i.e., multi-core.) The processor 710 may process or execute programs and/or data stored in the memory 720. For example, the processor 710 may control functions of the hologram depth modulation apparatus 70 by executing the programs stored in the memory 720.

The processor 710 may obtain the hologram data. For example, the processor 710 may receive the hologram data from other devices outside the hologram depth modulation apparatus 70. The hologram data may correspond to hologram contents directly captured by a holographic camera or previously generated through the CGH.

The processor 710 may determine a scale factor based on a hardware specification of a holographic display to display a 3D hologram image in a space by using the hologram data. For example, the processor 710 may calculate the scale factor based on a ratio between a pixel pitch assumed when generating the hologram data and an actual pixel pitch of the holographic display.

The processor 710 may modulate depth information of the hologram data based on the scale factor. For example, the processor 710 may modulate the depth information of the hologram data by using a neural network learned to correct depth distortion due to a difference between a hardware specification assumed when generating the hologram data and an actual hardware specification of a holographic display.

According to an example embodiment, the processor 710 may select, among a plurality of pre-trained neural networks, a neural network corresponding to a scale factor, and input the hologram data to the selected neural network to obtain modulated hologram data. In the embodiment, each of the plurality of pre-trained neural networks may be learned considering a single scale factor.

According to another example embodiment, the processor 710 may obtain modulated hologram data by using a pre-trained neural network having as an input both of a scale factor and hologram data. In the embodiment, the pre-trained neural networks may be learned considering a variable scale factor.

According to an example embodiment, the processor 710 may generate input hologram data based on an RGB image and a depth map, and input the input hologram data to a neural network to obtain output hologram data. The processor 710 may generate focal stack images by propagating output hologram data to certain depths and learn a neural network based on a loss function representing a difference between the focal stack images and reference focal images.

The reference focal images may correspond to target hologram data generated by directly reflecting a scale factor to an RGB image and a depth map. The neural network may be learned to output the target hologram data in response to an input of the input hologram data even without information about the RGB image and the depth map corresponding to the input hologram data. Meanwhile, in relation to the learning of the neural network considering a variable scale factors, certain depths may vary based on the scale factors.

According to another example embodiment, the processor 710 may receive a pre-trained neural network from external devices instead of performing learning of a neural network, and conduct only inference using the pre-trained neural network.

The hologram depth modulation apparatus 70 may refer to all apparatuses including the processor 710 and the memory 720. For example, the hologram depth modulation apparatus 70 may be an application processor implemented as a System-on-Chip. However, the disclosure is not limited thereto, and any electronic devices or systems including a component, such as an application processor, may be collectively referred to as the hologram depth modulation apparatus 70. Moreover, the hologram depth modulation apparatus 70 may include the processor 710 and the memory 720 respectively mounted on separate chips.

Figure 8:
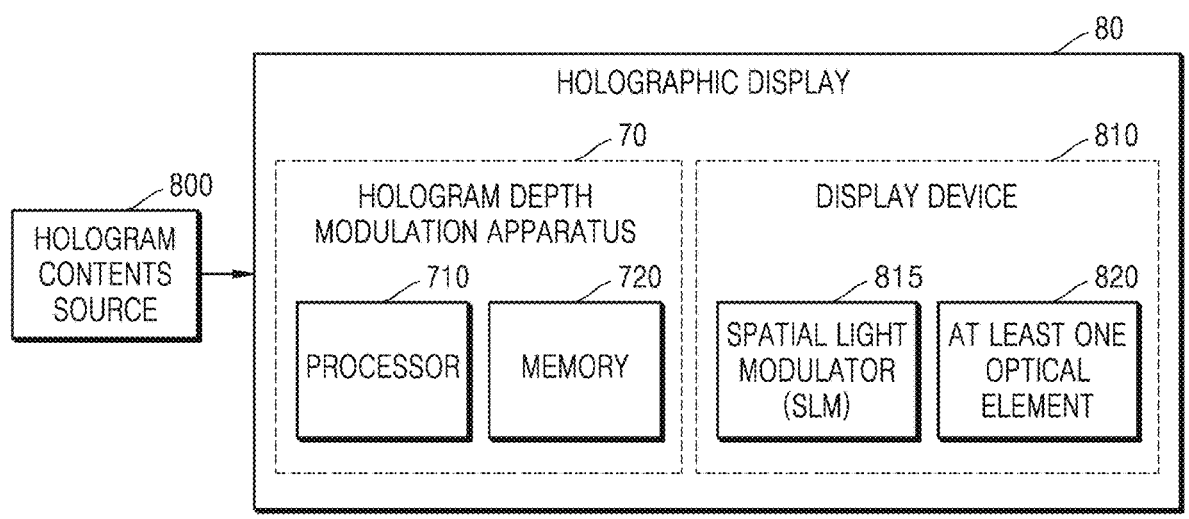
FIGS. 8, 9 and 10 are block diagrams for explaining various example embodiments of a holographic display system.
Figure 9:
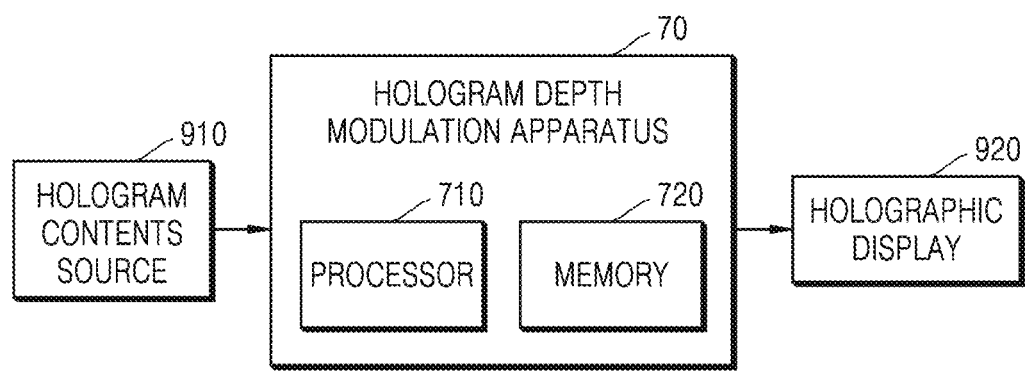
Figure 10:
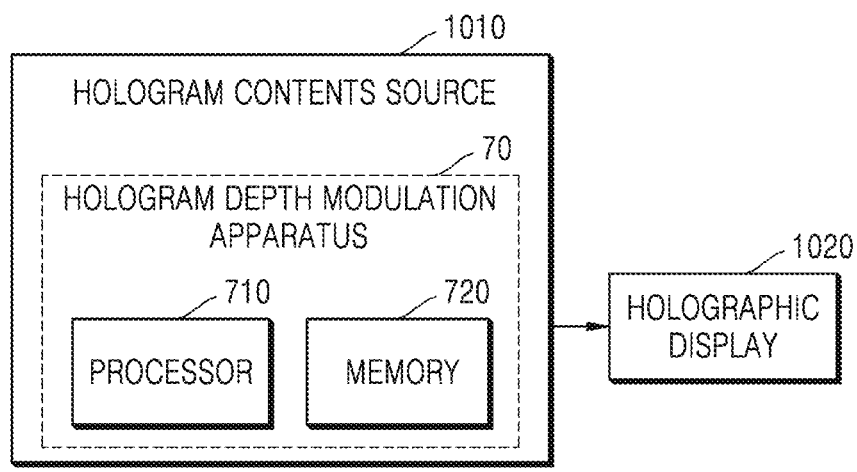

FIGS. 8 to 10 are block diagrams for explaining various example embodiments of a holographic display system.

FIG. 8 illustrates an example embodiment in which the hologram depth modulation apparatus 70 described with reference to FIG. 7 is included in a holographic display 80.

A hologram contents source 800 may refer to a device transferring hologram data, which has already been generated or captured, to the holographic display 80. The hologram contents source 800 may be a device, which directly generates hologram data. In an example embodiment, the hologram contents source 800 may be a holographic camera which obtains hologram data by photographing an object in a 3D space. In another example embodiment, the hologram contents source 800 may be a computing device, which directly generates hologram data through a computing algorithm, such as the CGH. However, the disclosure is not limited thereto, and the hologram contents source 800 may be an electronic device (e.g., a server, etc.) which simply transfers hologram data, which has already been generated or captured in another device, to the holographic display 80.

The holographic display 80 may be a device to display a 3D hologram image in a space. The holographic display 80 may include a display device 810. The display device 810 may include an SLM 815 and at least one optical element 820. Meanwhile, only the components relevant to the embodiments are shown in the holographic display 80 of FIG. 8. Accordingly, it is obvious to a person skilled in the art that the holographic display 80 may further include other components in addition to the components illustrated in FIG. 8.

The at least one optical element 820 may include at least one light source and/or at least one lens. The at least one light source may include various light sources, such as a laser diode (LD), a light emitting diode (LED), etc. The at least one lens may include at least one of a collimating lens collimating incident light to parallel light and a condensing lens condensing light towards a particular point. The collimating lens may include a cylinder lens or a cylinder lens array, and the condensing lens may be fabricated by a diffractive optical element or a holographic optical element of which the phase is recorded on a plane. However, the disclosure is not limited thereto.

The SLM 815 may be an element to spatially modulate light. The SLM 815 may be transmissive or reflective. For example, the SLM 815 may include a liquid crystal-on-silicon (LCos) element or a liquid crystal display (LCD) element; however, the disclosure is not limited thereto. The SLM 815 may control at least one of the intensity (amplitude), color, and phase of incident light, and may include a matrix of a plurality of pixels, which are individually controllable. The SLM 815 may modulate light incident from at least one optical element 820.

The holographic display 80 may further include the hologram depth modulation apparatus 70 described with reference to FIG. 7, in addition to the display device 810. The processor 710 of the hologram depth modulation apparatus 70 may obtain hologram data, determine a scale factor based on a hardware specification of a holographic display to display a 3D hologram image in a space by using the hologram data, and modulate depth information of the hologram data based on the scale factor.

Moreover, the processor 710 may play modulated hologram data by using the at least one optical element 820 and the SLM 815. However, the disclosure is not limited thereto, and the holographic display 80 may further include, in addition to the processor 710, a main processor configured to control all operations of the holographic display 80. The operation of controlling the at least one optical element 820 and the SLM 815 and outputting a 3D hologram image based on the modulated hologram data may be performed by the main processor. In this case, the processor 710 may only perform the operation of modulating the depth information of the hologram data.

As the holographic display 80 may properly modulate the depth information of the hologram data by using only the hologram depth modulation apparatus 70 even when the holographic display 80 only receives final hologram data without original data, such as a depth map, a 3D hologram image without depth distortion may be displayed.

FIG. 9 illustrates an example embodiment in which the hologram depth modulation apparatus 70 described with reference to FIG. 7 is implemented by a device separate from a hologram contents source 910 and a holographic display 920.

As the hologram contents source 910 may correspond to the hologram contents source 800 of FIG. 8, and the holographic display 920 may correspond to the holographic display 80 of FIG. 8 except that the holographic display 920 does not include the hologram depth modulation apparatus 70, any redundant description is omitted.

The hologram depth modulation apparatus 70 may be a device to transfer hologram data received from the hologram contents source 910 to the holographic display 920. For example, the hologram depth modulation apparatus 70 may be a contents repeater such as a set-top box. However, the disclosure is not limited thereto, and the hologram depth modulation apparatus 70 may be any one of various electronic devices. The hologram depth modulation apparatus 70 may modulate hologram data received from the hologram contents source 910 to be suitable for a hardware specification of the holographic display 920 and transfer the modulated hologram data to the holographic display 920.

The holographic display 920 may play the hologram data received from the hologram depth modulation apparatus 70 to display a 3D hologram image without depth distortion.

FIG. 10 illustrates an example embodiment in which the hologram depth modulation apparatus 70 described with reference to FIG. 7 is included in a hologram contents source 1010.

As the hologram contents source 1010 may correspond to the hologram contents source 800 of FIG. 8 except that the hologram contents source 1010 includes the hologram depth modulation apparatus 70, and a holographic display 1020 may correspond to the holographic display 80 of FIG. 8 except that the holographic display 1020 does not include the hologram depth modulation apparatus 70, any redundant description is omitted.

The hologram contents source 1010 may directly obtain hologram data, and modulate the obtained hologram data to be suitable for a hardware specification of the holographic display 1020 by using the hologram depth modulation apparatus 70. The hologram contents source 1010 may transmit the modulated hologram data to the holographic display 1020. Although FIG. 10 illustrates that the hologram contents source 1010 only includes the hologram depth modulation apparatus 70, it is obvious to a person skilled in the art that the hologram contents source 1010 may further include other components, such as a separate main processor, and a transceiver module.

As such, according to the holographic display systems of the disclosure, as the hologram depth modulation apparatus 70 properly recognizes depth information implicitly included in the hologram data and converts the depth information into a desired depth area, a 3D hologram image without depth distortion may be provided regardless of a hardware specification, type, etc. of the holographic display.

Figure 11:
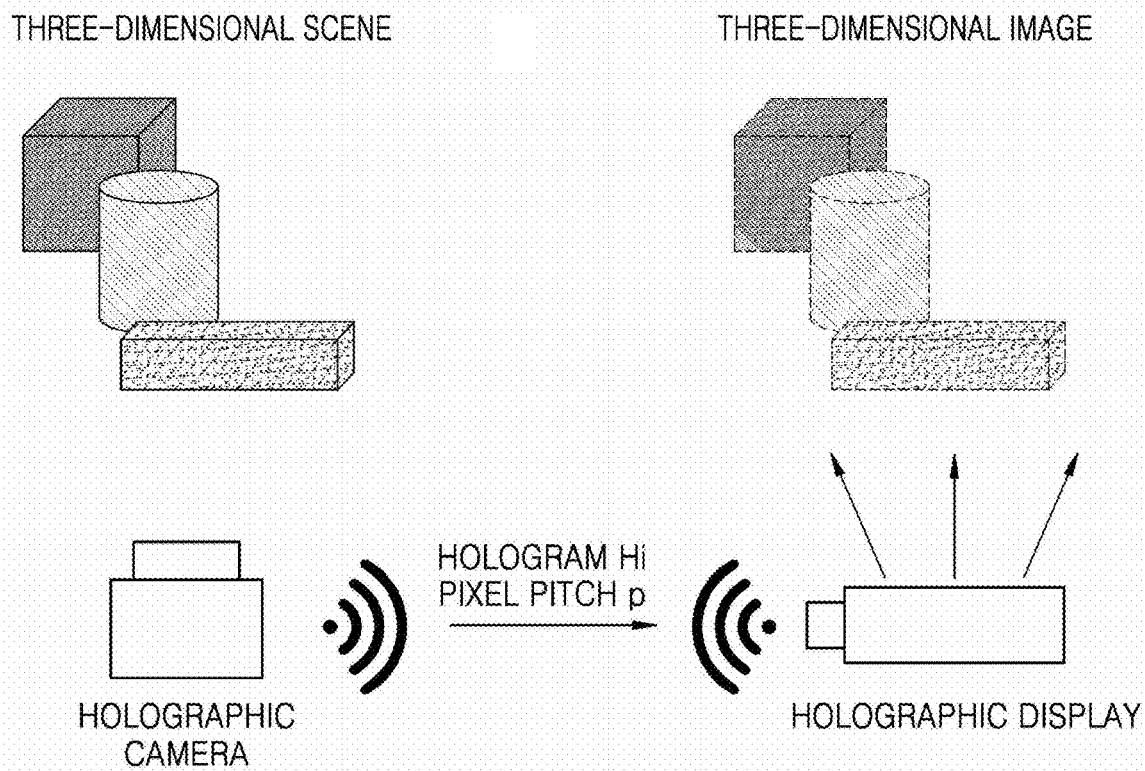
FIGS. 11 and 12 are diagrams for explaining an example of the holographic display system of FIG. 8.
Figure 12:
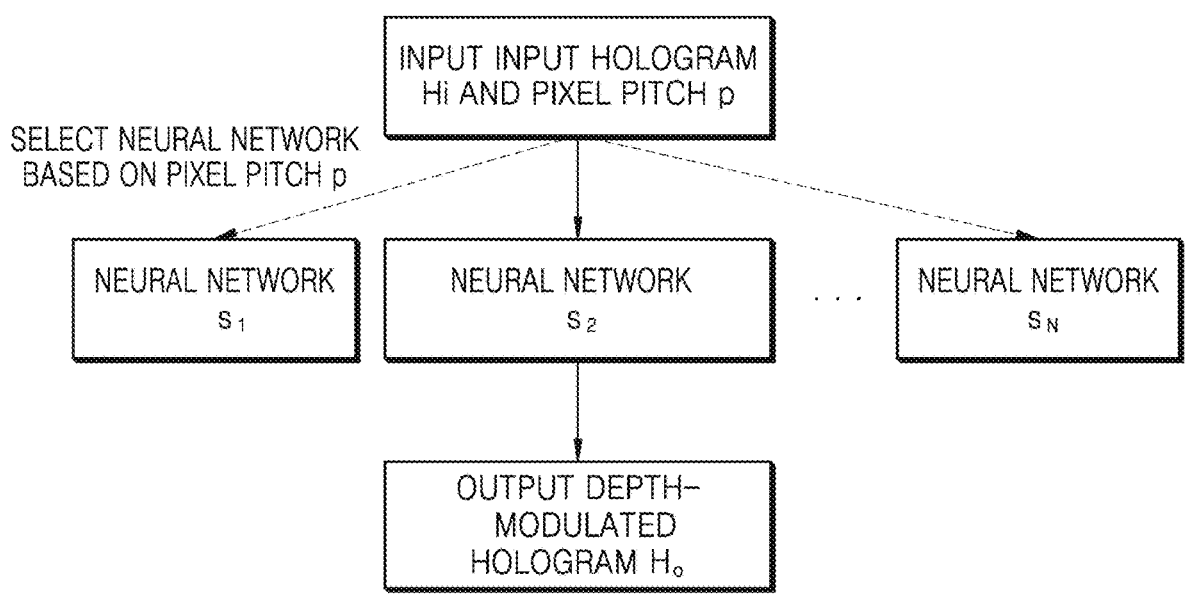

FIGS. 11 and 12 are diagrams for explaining an example of the holographic display system of FIG. 8.

FIG. 11 illustrates a holographic display system including a holographic camera and a holographic display. As the holographic camera may correspond to the hologram contents source 800 of FIG. 8, and the holographic display may correspond to the holographic display 80 of FIG. 8, any redundant description is omitted.

The holographic camera may be a self-interference holographic camera recording a hologram of incident light propagated from objects on a 3D scene. Generally, a light source having coherence, such as a laser light source, is used to record a hologram; however, the self-interference holographic camera may operate with respect to a light source which lacks coherence. The holographic camera may obtain hologram data corresponding to a 3D scene and transmit the obtained hologram data to the holographic display.

FIG. 12 illustrates a process of processing, by the holographic display, hologram data received from the holographic camera. The holographic display may additionally receive information about a pixel pitch p assumed in a process of capturing a 3D scene by the holographic camera, in addition to an input hologram $H_i$. Moreover, the holographic display may additionally receive information about a depth area of the input hologram $H_i$, but the disclosure is not limited thereto.

The holographic display may select a neural network based on the pixel pitch p. For example, the holographic display may calculate the scale factor based on the pixel pitch p and an actual pixel pitch p of the holographic display. However, the disclosure is not limited thereto, and even when the pixel pitch p is identical to the actual pixel pitch of the holographic display, the holographic display may arbitrarily set a scale factor to vary the depth perception of an observer. The holographic display may select a neural network corresponding to the scale factor. The plurality of neural networks may be pre-trained based on each scale factor (e.g., $s_1, s_2, \ldots, s_N$). In one embodiment, when the scale factor is $s_2$, the holographic display may select a neural network corresponding to $s_2$.

The holographic display may obtain modulated hologram data $H_o$ by inputting the input hologram $H_i$ to the selected neural network. The modulated hologram data $H_o$ may include information readjusted to be suitable for a hardware specification of the holographic display or intended depth perception. Accordingly, the holographic display may display a 3D hologram image without depth distortion even when no information, such as a depth map, is provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method of modulating a depth of a hologram, the method comprising:
   obtaining hologram data;
   determining a scale factor based on an actual hardware specification of a holographic display to display a three-dimensional (3D) hologram image in a space by using the hologram data; and
   modulating depth information of the hologram data based on the scale factor,
   wherein the modulating of the depth information of the hologram data comprises modulating the depth information of the hologram data by using a neural network trained to correct depth distortion due to a difference between an assumed hardware specification assumed when generating the hologram data and the actual hardware specification of the holographic display.

2. The method of claim 1, wherein the modulating of the depth information of the hologram data further comprises:
   selecting, among a plurality of pre-trained neural networks, the neural network corresponding to the scale factor; and
   obtaining modulated hologram data by inputting the hologram data to the selected neural network.

3. The method of claim 1, wherein the modulating of the depth information of the hologram data further comprises obtaining modulated hologram data by using a pre-trained neural network having both the scale factor and the hologram data as inputs.

4. The method of claim 1, further comprising training the neural network,
   wherein the training of the neural network comprises:
   generating input hologram data based on a red-green-blue (RGB) image and a depth map;
   obtaining output hologram data by inputting the input hologram data to the neural network;
   generating focal stack images by propagating the output hologram to certain depths; and
   training the neural network based on a loss function representing a difference between the focal stack images and reference focal images.

5. The method of claim 4, wherein the reference focal images correspond to target hologram data generated by directly reflecting the scale factor to the RGB image and the depth map.

6. The method of claim 4, wherein the neural network is trained to output target hologram data based on an input of the input hologram data without information about the RGB image and the depth map corresponding to the input hologram data.

7. The method of claim 4, wherein the certain depths are variable based on the scale factor.

8. The method of claim 1, wherein the determining of the scale factor comprises calculating the scale factor based on a ratio between a pixel pitch assumed when generating the hologram data and an actual pixel pitch of the holographic display.

9. The method of claim 1, wherein the hologram data corresponds to hologram contents directly captured by a holographic camera or previously generated through computer-generated holography (CGH).

10. A hologram depth modulation apparatus comprising:
    a memory storing one or more instructions; and
    a processor configured to execute the one or more instructions to:
    obtain hologram data,
    determine a scale factor based on an actual hardware specification of a holographic display to display a three-dimensional (3D) hologram image in a space by using the hologram data, and
    modulate depth information of the hologram data based on the scale factor,
    wherein the processor is further configured to modulate the depth information of the hologram data by using a neural network trained to correct depth distortion due to a difference between an assumed hardware specification assumed when generating the hologram data and the actual hardware specification of the holographic display.

11. The hologram depth modulation apparatus of claim 10, wherein the processor is further configured to select, among a plurality of pre-trained neural networks, the neural network corresponding to the scale factor, and obtain modulated hologram data by inputting the hologram data to the selected neural network.

12. The hologram depth modulation apparatus of claim 10, wherein the processor is further configured to obtain modulated hologram data by using a pre-trained neural network having both the scale factor and the hologram data as inputs.

13. The hologram depth modulation apparatus of claim 10, wherein the processor is further configured to:
  generate input hologram data based on a red-green-blue (RGB) image and a depth map,
  obtain output hologram data by inputting the input hologram data to the neural network,
  generate focal stack images by propagating an output hologram to certain depths, and
  train the neural network based on a loss function representing a difference between the focal stack images and reference focal images.

14. The hologram depth modulation apparatus of claim 13, wherein the reference focal images correspond to target hologram data generated by directly reflecting the scale factor to the RGB image and the depth map.

15. The hologram depth modulation apparatus of claim 13, wherein the neural network is trained to output target hologram data based on an input of the input hologram data without information about the RGB image and the depth map corresponding to the input hologram data.

16. The hologram depth modulation apparatus of claim 13, wherein the certain depths are variable based on the scale factor.

17. The hologram depth modulation apparatus of claim 10, wherein the processor is further configured to calculate the scale factor based on a ratio between a pixel pitch assumed when generating the hologram data and an actual pixel pitch of the holographic display.

18. A holographic display comprising:
  at least one optical element;
  a spatial light modulator (SLM) configured to modulate light incident from the at least one optical element;
  a memory storing one or more instructions; and
  at least one processor configured to execute the one or more instructions to:
    obtain hologram data, determine a scale factor based on an actual hardware specification of a holographic display to display a three-dimensional (3D) hologram image in a space by using the hologram data, modulate depth information of the hologram data based on the scale factor, and play modulated hologram data by using the at least one optical element and the SLM
  wherein the at least one processor is further configured to modulate the depth information of the hologram data by using a neural network trained to correct depth distortion due to a difference between an assumed hardware specification assumed when generating the hologram data and the actual hardware specification of the holographic display.

\* \* \* \* \*